(12) United States Patent
Takeishi et al.

(10) Patent No.: US 9,009,422 B2
(45) Date of Patent: Apr. 14, 2015

(54) INFORMATION PROCESSING APPARATUS AND INTERRUPT CONTROL METHOD

(75) Inventors: Naoto Takeishi, Kawasaki (JP);
Kazuyoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 707 days.

(21) Appl. No.: 13/196,965

(22) Filed: Aug. 3, 2011

(65) Prior Publication Data

US 2012/0042137 A1 Feb. 16, 2012

(30) Foreign Application Priority Data

Aug. 10, 2010 (JP) ................................ 2010-179561

(51) Int. Cl.
*G06F 12/16* (2006.01)
*G06F 9/30* (2006.01)
*G06F 9/32* (2006.01)

(52) U.S. Cl.
CPC .......... *G06F 9/30094* (2013.01); *G06F 9/3017* (2013.01); *G06F 9/327* (2013.01)

(58) Field of Classification Search
CPC .............................. G06F 3/067; G06F 3/0605
USPC ......................................... 711/154, 156, 118
See application file for complete search history.

(56) References Cited

U.S. PATENT DOCUMENTS

| 5,881,295 | A | 3/1999 | Iwata | |
|---|---|---|---|---|
| 2004/0268064 | A1* | 12/2004 | Rudelic | 711/156 |
| 2006/0271762 | A1* | 11/2006 | Kramer | 711/212 |

FOREIGN PATENT DOCUMENTS

| JP | S58-117059 | A | 7/1983 |
|---|---|---|---|
| JP | S58-215779 | A | 12/1983 |
| JP | S62-043737 | A | 2/1987 |
| JP | 2-244334 | A | 9/1990 |
| JP | 2-244345 | A | 9/1990 |
| JP | 2-245937 | A | 10/1990 |
| JP | 3-105529 | A | 5/1991 |
| JP | 3-225529 | A | 10/1991 |
| JP | 8-278895 | A | 10/1996 |
| WO | 2009-087159 | A1 | 7/2009 |

OTHER PUBLICATIONS

Japanese Office Action mailed by JPO and corresponding to Japanese application No. 2010-179561 on Mar. 4, 2014, with English translation.

* cited by examiner

*Primary Examiner* — Jae Yu

(74) *Attorney, Agent, or Firm* — Fujitsu Patent Center

(57) ABSTRACT

A memory stores therein a program status word containing an address of data that is to be read when an interrupt process is executed. a processor determines whether or not the program status word stored in the memory is available, controls the memory to stores a determination result in the memory in association with the program status word, acquires the program status word and the determination result from the memory when the interrupt process occurs, and reads data on the basis of the address contained in the acquired program status word when the acquired determination result indicates that the program status word is available.

6 Claims, 11 Drawing Sheets

FIG.3

| Offset | Content |
|---|---|
| 0 | NEW PSW FOR RESTART INTERRUPT |
| 8 | NEW PSW FOR RESTART INTERRUPT |
| 16 | |
| 24 | OLD PSW FOR EXTERNAL INTERRUPT |
| 32 | OLD PSW FOR SVC INTERRUPT |
| 40 | OLD PSW FOR PROGRAM INTERRUPT |
| 48 | OLD PSW FOR MACHINE CHECK |
| 56 | OLD PSW FOR INPUT-OUTPUT INTERRUPT |
| 64 | |
| 88 | NEW PSW FOR EXTERNAL INTERRUPT |
| 96 | NEW PSW FOR SVC INTERRUPT |
| 104 | NEW PSW FOR PROGRAM INTERRUPT |
| 112 | NEW PSW FOR MACHINE CHECK |
| 120 | NEW PSW FOR INPUT-OUTPUT INTERRUPT |
| 128 | STORAGE AREA FOR INTERRUPT RELATED INFORMATION + VARIOUS CONTROL INFORMATION |
| 512 | |

FIG.4

| VALUE | | AVAILABILITY OF NEW PSW |
|---|---|---|
| BIT 0 | BIT 1 | |
| 0 | 0 | NEW PSW IS UNAVAILABLE |
| 1 | 0 | NEW PSW IS UNAVAILABLE |
| 0 | 1 | NEW PSW IS AVAILABLE |
| 1 | 1 | NEW PSW IS UNAVAILABLE |

FIG.5

| VALUE | RESULT OF FORMAT CHECK |
|---|---|
| 00 | FORMAT OF NEW PSW IS CORRECT |
| 01 | FORMAT OF NEW PSW IS INCORRECT |
| 10 | IA OF NEW PSW IS ODD NUMBER |
| 11 | NOT USED |

INFORMATION PROCESSING APPARATUS AND INTERRUPT CONTROL METHOD

CROSS-REFERENCE TO RELATED APPLICATION

This application is based upon and claims the benefit of priority of the prior Japanese Patent Application No. 2010-179561, filed on Aug. 10, 2010, the entire contents of which are incorporated herein by reference.

FIELD

The embodiments discussed herein are directed to an information processing apparatus and an interrupt control program.

BACKGROUND

Conventionally, an information processing apparatus, such as a server, emulates a CPU (Central Processing Unit) that has architecture different from that of a physical CPU installed in the information processing apparatus. The information processing apparatus also emulates, in addition to the CPU, an OS (Operating System) that is different from an OS installed in the information processing apparatus.

For example, a server equipped with an open source OS, such as LINUX (registered trademark), reproduces a general-purpose OS, which is installed in mainframe, within the own server and runs application or the like for the general-purpose OS.

Such an information processing apparatus not only executes instruction emulation for reproducing an instruction for a different architecture but also executes an interrupt process when any exception occurs. Regarding the interrupt process, for example, Japanese Laid-open Patent Publication No. 58-117059 discloses a technology, in which a status monitoring function, which has been reset every time an interrupt process occurs, is reset only when the reset is needed. Furthermore, Japanese Laid-open Patent Publication No. 62-043737 discloses a technology, in which a PSW (Program Status Word) corresponding to an interrupt process is fixedly stored in a buffer memory that is different form a general buffer memory so that time taken to load the PSW at the time of the interrupt process can be shortened.

When a CPU executes an instruction, information may be overwritten in a PSA (Program Save Area) that is an area of a memory for storing information, such as a PSW corresponding to an interrupt process. Even if the PSA is locked in order to prevent overwriting, when information in the PSA needs to be updated, the lock is released, so that a PSW may be overwritten at the time of the update. In particular, when a memory is shared by a plurality of CPUs, a CPU may overwrite a PSA that is reserved by another CPU.

In this case, a PSW stored in the PSA is rewritten; therefore, a conventional information processing apparatus executes a determination process for determining whether or not a PSW corresponding to an interrupt process contains an error every time an interrupt process occurs. Because the determination process is executed every time an interrupt process occurs, there is a problem in that time taken to execute the interrupt process increases.

In the determination process, whether or not a PSW contains an error is determined by checking values in a plurality of fields in the PSW of 64 bits. For example, when emulating an OS in a 31-bit address mode, an information processing apparatus determines whether bits 24 to 31 are 1 or not. The information processing apparatus also checks a value of each of bit 0, bits 2 and 3, a bit 12, a bit 16, and a bit 17. When all of the bits have normal values, the information processing apparatus executes an interrupt process.

Because the information processing apparatus executes the above determination process every time an interrupt process occurs, when interrupt processes occur frequently, the determination process on the PSW becomes a bottleneck. Therefore, overhead in the interrupt process increases and time taken before a start of the interrupt process increases, resulting in increasing time taken to the interrupt process as a whole.

SUMMARY

According to an aspect of an embodiment of the invention, an information processing apparatus includes a memory that stores therein a program status word containing an address of data that is to be read when an interrupt process is executed; and a processor determines whether or not the program status word stored in the memory is available, controls the memory to stores a determination result in the memory in association with the program status word, acquires the program status word and the determination result from the memory when the interrupt process occurs, and reads data on the basis of the address contained in the acquired program status word when the acquired determination result indicates that the program status word is available.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 illustrates an example of information stored in a PSA area;

FIG. 4 illustrates an example of determination of available flags stored in a new-PSW storage area;

FIG. 5 illustrates an example of determination of check results stored in the new-PSW storage area;

DESCRIPTION OF EMBODIMENTS

Preferred embodiments of the present invention will be explained with reference to accompanying drawings. The present invention is not limited by the embodiments.

[a] First Embodiment

Figure 1:
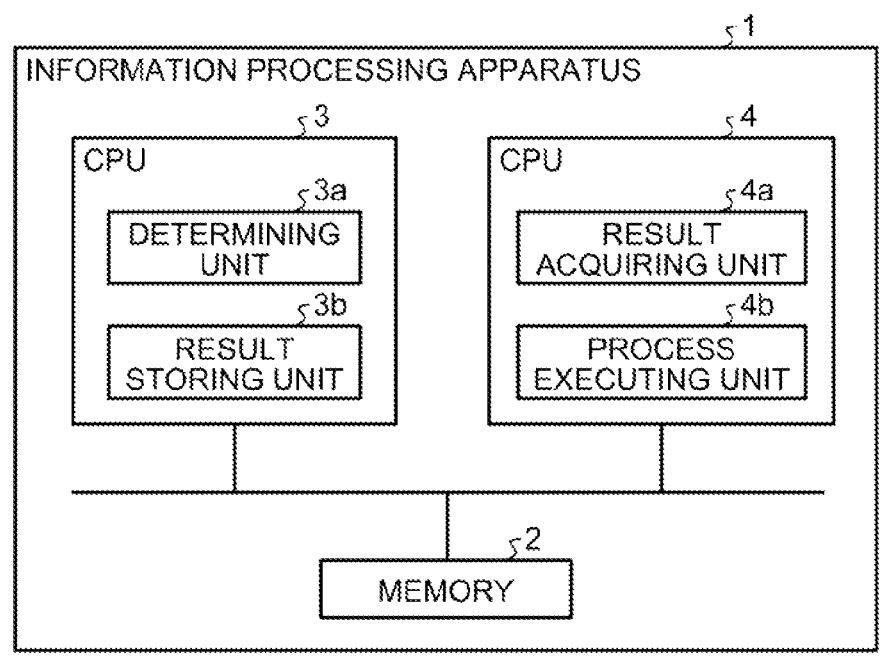
FIG. 1 is a block diagram of a configuration of an information processing apparatus according to a first embodiment.

FIG. 1 is a block diagram of a configuration of an information processing apparatus according to a first embodiment. As illustrated in FIG. 1, an information processing apparatus 1 is an apparatus, such as a server, that includes a memory 2, a CPU (Central Processing Unit) 3, and a CPU 4, which are connected to one another via a bus. The memory 2 is, for example, a memory for storing a program status word corresponding to an interrupt process and storing a determination result indicating whether or not the program status word contains an error, in an associated manner.

The program status word is also referred to as a PSW (Program Status Word). The program status word corresponding to an interrupt process contains an instruction address (IA) indicating a storage destination of data, in which an execution content (an instruction) of the interrupt process is defined, and contains data that is determined in advance in accordance with a data format of the PSW. The CPU reads an instruction address from a program status word corresponding to an interrupt process in response to occurrence of an interrupt and reads an instruction for the interrupt process on the basis of the read instruction address.

The CPU 3 is an arithmetic processing device that does not execute various processes, such as a normal arithmetic process and an interrupt process, and includes a determining unit 3a and a result storing unit 3b. The determining unit 3a determines whether or not a program status word corresponding to an interrupt process contains an error, that is, whether or not the program status word can be used as a header of an instruction address. The determination of the program status word is performed by determining whether data, which is determined in advance in accordance with a data format and which is contained in the program status word, matches a data format. The result storing unit 3b stores the program status word that is determined by the determining unit 3a and a determination result in the memory 2 in an associated manner.

The CPU 4 is an arithmetic processing device that executes various processes, such as a normal arithmetic process and an interrupt process, and includes a result acquiring unit 4a and a process executing unit 4b. For example, the CPU 4 executes a process for emulating a CPU or an OS (Operating System) having architecture that is different from that of a CPU or an OS installed on the information processing apparatus 1. The result acquiring unit 4a acquires, when an interrupt process occurs, a determination result of a program status word corresponding to the interrupt process from the memory 2. When the determination result acquired by the result acquiring unit 4a is normal, the process executing unit 4b acquires the program status word associated with the determination result from the memory 2 and executes the interrupt process by using an instruction address of the acquired program status word.

As described above, the information processing apparatus 1 causes the CPU 3, which does not execute various processes, such as an interrupt process, to check a PSW before occurrence of an interrupt. When the CPU 4 executes an interrupt process, the information processing apparatus 1 starts the interrupt process without checking the PSW. Therefore, it is possible to shorten a process time of the interrupt process. The CPU 4 may include the determining unit 3a and the result storing unit 3b in addition to the result acquiring unit 4a and the process executing unit 4b. By executing the determination process between various processes, such as a normal arithmetic process and an interrupt process, the CPU 4 can execute the interrupt process without performing a format check of a PSW.

[b] Second Embodiment

An information processing apparatus according to a second embodiment will be explained below. In the second embodiment, the configuration of the information processing apparatus, the flow of processes, and advantages of the second embodiment will be explained in this order. In the second embodiment, a PSW (Program Status Word) corresponding to an interrupt process is described as a "new PSW" and a PSW that is maintained in a register by the CPU at the time of occurrence of the interrupt process is described as an "old PSW".

Configuration of the Information Processing Apparatus

Figure 2:
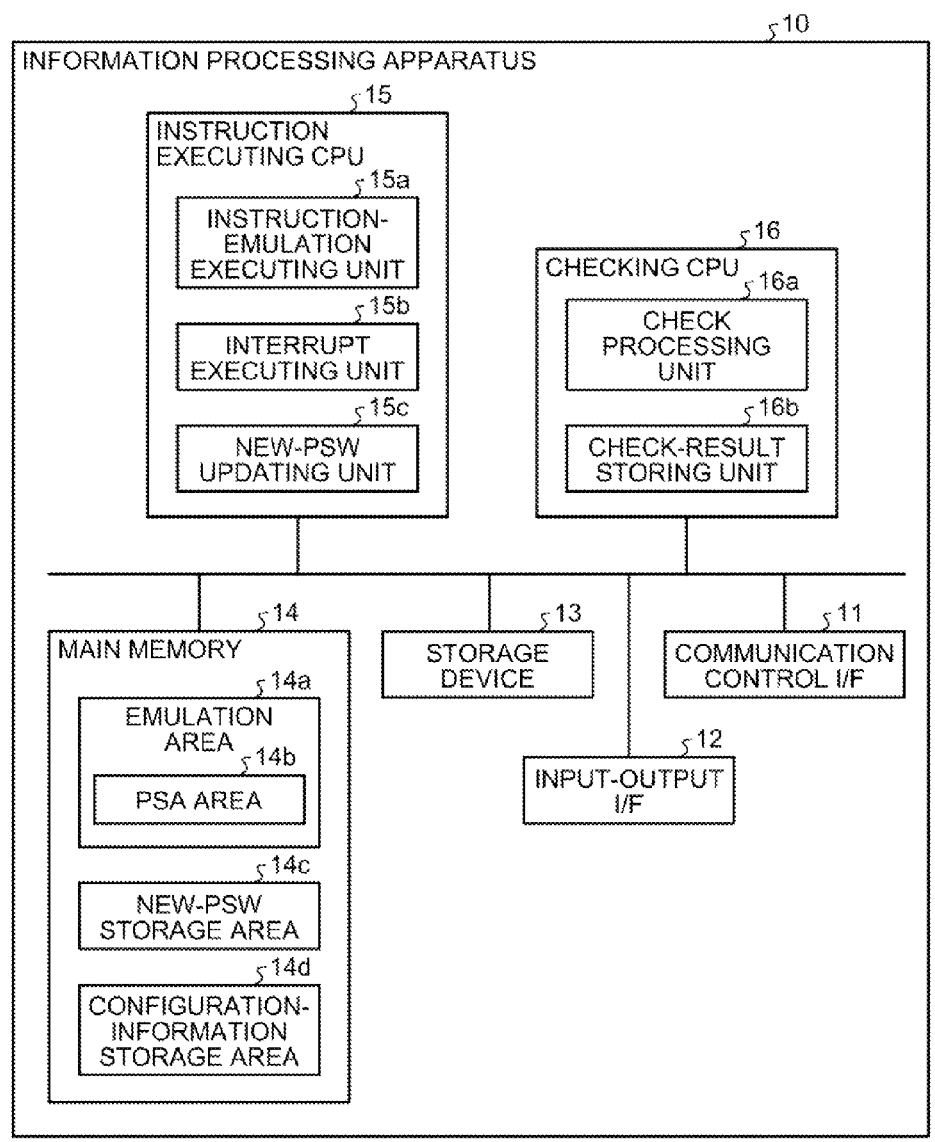
FIG. 2 is a block diagram of a configuration of an information processing apparatus according to a second embodiment.

FIG. 2 is a block diagram of the configuration of the information processing apparatus according to the second embodiment. As illustrated in FIG. 2, an information processing apparatus 10 includes a communication control I/F 11, an input-output I/F 12, an storage device 13, a main memory 14, an instruction executing CPU 15, and a checking CPU 16, which are connected to one another via a bus.

The communication control I/F 11 is an interface, such as a network card, that controls communication with other devices. The communication control I/F 11 receives various requests from the other devices and transmits results of processes or the like to the other devices.

The input-output I/F 12 is, for example, an input device, such as a keyboard or a mouse, and an output device, such as a display or a speaker. For example, the input-output I/F 12 receives a transaction execution instruction from an administrator or the like and displays a result of execution. The storage device 13 is a storage device, such as a hard disk drive, for storing various types of data to be used by the instruction executing CPU 15 for executing instructions.

The main memory 14 is a main memory or the like for storing various types of data or programs to be used by the instruction executing CPU 15 for executing instructions. The main memory 14 includes an emulation area 14a, a new-PSW storage area 14c, and a configuration-information storage area 14d.

The emulation area 14a is an area representing a memory space for an OS or the like to be emulated by the instruction executing CPU 15. The emulation area 14a includes a PSA (Program Save Area) area 14b. For example, when the information processing apparatus 10 emulates a general-purpose OS used for mainframe while running LINUX (registered trademark), the emulation area 14a represents a memory space for the general-purpose OS.

The PSA area 14b is an area that is reserved in advance within the emulation area 14a and that stores therein a new PSW, which is loaded at the time of occurrence of an interrupt, and an old PSW, which is maintained by the instruction executing CPU 15 at the time of occurrence of the interrupt. The PSA area 14b also stores therein interrupt related information, such as contents of a register at the time of occurrence of an interrupt, or an interrupt code.

FIG. 3 illustrates an example of information stored in the PSA area. The PSA area illustrated in FIG. 3 is reserved and stored in a low address area from 0 bytes to 512 bytes in the emulation area 14a. The values illustrated in FIG. 3 are just examples, and the present invention is not limited to these examples. Furthermore, the types of interrupts illustrated in FIG. 3 are just examples, and the present invention is not limited to these examples.

As illustrated in FIG. 3, a new PSW that is to be loaded by the instruction executing CPU 15 when a restart interrupt occurs is stored in "0 bytes to 7 bytes". An old PSW that is maintained in a register or the like by the instruction executing CPU 15 at the time of occurrence of a restart interrupt is stored in "8 bytes to 15 bytes". An old PSW that is maintained in a register or the like by the instruction executing CPU 15 at the time of occurrence of an external interrupt is stored in "24 bytes to 31 bytes". An old PSW that is maintained in a register or the like by the instruction executing CPU 15 at the time of occurrence of an SVC (supervisor call) interrupt is stored in "32 bytes to 39 bytes".

An old PSW that is maintained in a register or the like by the instruction executing CPU 15 at the time of occurrence of a program interrupt is stored in "40 bytes to 47 bytes". An old PSW that is maintained in a register or the like by the instruction executing CPU 15 at the time of occurrence of machine check is stored in "48 bytes to 55 bytes". An old PSW that is maintained in a register or the like by the instruction executing CPU 15 at the time of occurrence of an input-output interrupt is stored in "56 bytes to 63 bytes".

A new PSW that is to be loaded by the instruction executing CPU 15 when an external interrupt occurs is stored in "88 bytes to 95 bytes". A new PSW that is to be loaded by the instruction executing CPU 15 when an SVC interrupt occurs is stored in "96 bytes to 103 bytes". A new PSW that is to be loaded by the instruction executing CPU 15 when a program interrupt occurs is stored in "104 bytes to 111 bytes". A new PSW that is to be loaded by the instruction executing CPU 15 when machine check occurs is stored in "112 bytes to 119 bytes". A new PSW that is to be loaded by the instruction executing CPU 15 when an input-output interrupt occurs is stored in "120 bytes to 127 bytes". Interrupt related information, control information used by the information processing apparatus 10 at the time of execution of various processes, and the like are stored in "128 bytes to 512 bytes".

The new-PSW storage area 14c is an area for sharing information, which is used when an interrupt occurs, between the instruction executing CPU 15 and the checking CPU 16. The new-PSW storage area 14c stores therein "a new PSW, an available flag, and a check result" in association with each "interrupt type".

The "interrupt type" indicates a type of an interrupt, such as an external interrupt, an input-output interrupt, or a program interrupt. The "new PSW" is, for example, a 64-bit PSW to be loaded when an interrupt occurs, and is written in a format according to specifications of an emulation operating mechanism or the like included in the information processing apparatus 10. The "available flag" is a 2-bit flag used for determining whether or not a new PSW is available. A "bit 0 of the available flag" is a flag indicating whether or not a new PSW in the PSA area 14b is rewritten. When the new PSW is rewritten, "1" is stored in this flag, and when the new PSW is not rewritten, "0" is stored in this flag. A "bit 1 of the available flag" is a flag indicating whether or not the checking CPU 16 has completed a format check of a new PSW. When the format check is completed, "1" is stored in this flag, and when the format check is not completed, "0" is stored in this flag.

An example of determination of the available flag will be described below. The instruction executing CPU 15 determines whether or not a new PSW is available on the basis of values illustrated in FIG. 4. FIG. 4 illustrates an example of determination of available flags stored in the new-PSW storage area. As illustrated in FIG. 4, when "bit 0, bit 1" is "0, 0", it is indicated that a new PSW which has not been updated and a format of which has not been checked is stored, so that the instruction executing CPU 15 determines that the new PSW is unavailable. When "bit 0, bit 1" is "1, 0", it is indicated that a new PSW which has been updated but a format of which has not been checked is stored, so that the instruction executing CPU 15 determines that the new PSW is unavailable. When "bit 0, bit 1" is "0, 1", it is indicated that a new PSW of which format has been checked is stored, so that the instruction executing CPU 15 determines that the new PSW is available. When "bit 0, bit 1" is "1, 1", it is indicated that a new PSW of which format has been checked but which has been updated after the format check is stored, so that the instruction executing CPU 15 determines that the new PSW is unavailable. While an example in which 2-bit information is used is explained above, the present invention is not limited to this example.

The "check result" is 2-bit information indicating a result of determination that is performed by the checking CPU 16 to determine whether or not a PSW contains an error, for example, a result of the format check of a new PSW. FIG. 5 illustrates an example of determination of check results stored in the new-PSW storage area. As illustrated in FIG. 5, a value of "00" indicates that a format of a new PSW is correct and a value of "01" indicates that a format of a new PSW is incorrect. A value of "10" indicates that an instruction address (IA) of a new PSW is an odd number and a value of "11" is not used in the present embodiment. While an example in which 2-bit information is used is explained above, the present invention is not limited to this example.

Referring back to FIG. 2, the configuration-information storage area 14d stores therein system configuration information, such as the number of instruction executing CPUs or the number of extra CPUs, that is used for determining how to allocate the checking CPU 16 or the instruction executing CPU 15. The "number of instruction executing CPUs" is the number of CPUs that execute an instruction or that are executing an instruction, and the "number of extra CPUs" is the number of CPUs that do not execute an instruction or that are not executing an instruction. The information stored as above may be stored by an administrator or the like, or may be stored by the information processing apparatus 10 in accordance with a load status of each CPU or an instruction processing status of each CPU.

The instruction executing CPU 15 is a CPU that executes an interrupt process except for the format check of a new PSW and that executes an instruction emulation process. The instruction executing CPU 15 includes an instruction-emulation executing unit 15a, an interrupt executing unit 15b, and a new-PSW updating unit 15c. The instruction executing CPU 15 executes a normal arithmetic process or the like in addition to a process for emulating an OS or a CPU that has architecture different from architecture of an OS or a CPU included in the information processing apparatus 10.

The instruction-emulation executing unit 15a emulates an OS or a CPU and executes an instruction from the emulated OS or the emulated CPU. For example, the instruction-emulation executing unit 15a executes an instruction from the emulated OS or the emulated CPU by using the emulation area 14a represented in the main memory 14, thereby executing an instruction emulation process.

When an interrupt process occurs, the interrupt executing unit 15b acquires a determination result of a new PSW corresponding to the interrupt process from the new-PSW storage area 14c. When the acquired determination result is normal, the interrupt executing unit 15b acquires, from the new-PSW storage area 14c, the new PSW that is associated with the determination result and executes the interrupt process by using an instruction address of the acquired new PSW.

For example, when an external interrupt occurs, the interrupt executing unit 15*b* stores an old PSW, which is maintained in a register or the like at the time of occurrence of the external interrupt, in the PSA area 14*b*. Subsequently, the interrupt executing unit 15*b* acquires, from the new-PSW storage area 14*c*, an "available flag" associated with a new PSW of the external interrupt. When the acquired "available flag" is "0, 0", "1, 0", or "1, 1", the interrupt executing unit 15*b* determines that the new PSW is unavailable, and monitors the "available flag" until the "available flag" becomes "0, 1" or executes exception handling. When the "available flag" is "0, 1", the interrupt executing unit 15*b* determines that the new PSW is available and acquires a "check result" associated with the new PSW from the new-PSW storage area 14*c*. The interrupt executing unit 15*b* clears the available flag after the exception handling is completed. Or the available flag is cleared by the exception handling after the exception handling is completed.

When the acquired "check result" is "00", the interrupt executing unit 15*b* determines that a format of the new PSW is correct and acquires the new PSW from the new-PSW storage area 14*c*. Subsequently, the interrupt executing unit 15*b* ends the external interrupt process by using an instruction address of the acquired new PSW. On the other hand, when the acquired "check result" is "01", the interrupt executing unit 15*b* determines that the format of the new PSW is incorrect and ends the process or executes exception handling. Similarly, when the acquired "check result" is "10", the interrupt executing unit 15*b* determines that the instruction address of the new PSW is an odd number and ends the process or executes exception handling.

When the executed interrupt process is completed, the interrupt executing unit 15*b* notifies the instruction-emulation executing unit 15*a* of completion of the interrupt process. The instruction-emulation executing unit 15*a* that has received the notice loads the old PSW that has been stored in the PSA area 14*b* upon occurrence of the interrupt, and resumes a process that has been interrupted due to the occurrence of the interrupt by using an instruction address of the old PSW.

Referring back to FIG. 2, the new-PSW updating unit 15*c* updates a new PSW stored in the PSA area 14*b*. When receiving an update instruction from an OS or an interrupt program, the new-PSW updating unit 15*c* updates a corresponding new PSW. Accordingly, the new-PSW updating unit 15*c* changes a value of the "bit 0" of the "available flag", which is stored in the new-PSW storage area 14*c* in association with the updated new PSW, to "1". That is, the new-PSW updating unit 15*c* synchronizes the update of the new PSW with the update of the "available flag".

As an example of a synchronization method, the new-PSW updating unit 15*c* executes a trap for detecting update of a new PSW, and when detecting the update of the new PSW, sends a notice to a kernel. The kernel that has received the notice excludes an access to the corresponding new PSW. The new-PSW updating unit 15*c* updates a value of the "bit 0" of the "available flag" corresponding to the new PSW to "1". In this manner, the new-PSW updating unit 15*c* can synchronize the update of the new PSW with the update of the "available flag". Furthermore, it is possible to prevent the new PSW from being loaded during a time period from the update of the new PSW to the update of the "available flag".

The checking CPU 16 is a CPU that determines whether a format of a PSW has an error or not. The checking CPU 16 includes a check processing unit 16*a* and a check-result storing unit 16*b*. The checking CPU 16 is a CPU that does not execute various processes, such as a normal arithmetic process and an interrupt process. The type of an interrupt for which a format check is to be executed can be arbitrarily specified.

The check processing unit 16*a* executes a format check for determining whether or not a new PSW corresponding to an interrupt process has an error, at a predetermined time interval. For example, when a new PSW is newly stored in the PSA area 14*b* through operation of an OS or the like or when it is detected that the "bit 0" of the "available flag" in the new-PSW storage area is changed to "1", the check processing unit 16*a* loads a corresponding new PSW from the PSA area 14*b* and executes a format check.

A method of the format check executed by the check processing unit 16*a* is specified by an address mode of a CPU or the like or a bit width. Because the information processing apparatus 10 can arbitrarily use a CPU and an address mode, any check methods that correspond to the address mode can be used.

For example, when the address mode has 31 bits, the check processing unit 16*a* checks whether all of values of bits 24 to 32 are 0 and whether a value of a bit 0 is 0, among a new PSW of 64 bits. Furthermore, the check processing unit 16*a* checks whether values of bits 2 and 3 are 0, whether a value of a bit 12 is 1, whether a value of a bit 16 is 0, whether a value of a bit 17 is 1, and whether an instruction address of the new PSW is not an odd number. Then, the check processing unit 16*a* outputs a check result to the check-result storing unit 16*b*.

The check-result storing unit 16*b* stores the new PSW, for which whether there is an error or not has been determined by the check processing unit 16*a*, and a determination result in the new-PSW storage area 14*c* in an associated manner. For example, assuming that the check-result storing unit 16*b* receives, from the check processing unit 16*a*, a notice indicating that "a format of the new PSW is correct" as a check result of the new PSW for an input-output interrupt, the check-result storing unit 16*b* stores "the new PSW for the input-output interrupt" and the check result of "00" in the new-PSW storage area 14*c* in an associated manner, and stores "1" in the bit 1 of the "available flag".

Furthermore, assuming that the check-result storing unit 16*b* receives, from the check processing unit 16*a*, a notice indicating that "an instruction address of the new PSW is an odd number" as a check result of the new PSW for an external interrupt, the check-result storing unit 16*b* stores "the new PSW for the external interrupt" and the check result of "10" in the new-PSW storage area 14*c* in an associated manner, and stores "1" in the bit 1 of the "available flag".

Similarly, assuming that the check-result storing unit 16*b* receives, from the check processing unit 16*a*, a notice indicating that "a format of the new PSW is incorrect" as a check result of the new PSW for a program interrupt, the check-result storing unit 16*b* stores "the new PSW for the program interrupt" and the check result of "01" in the new-PSW storage area 14*c* in an associated manner, and stores "1" in the bit 1 of the "available flag".

Relationship Between a Format Check of a New PSW and an Interrupt Process

Figure 6:
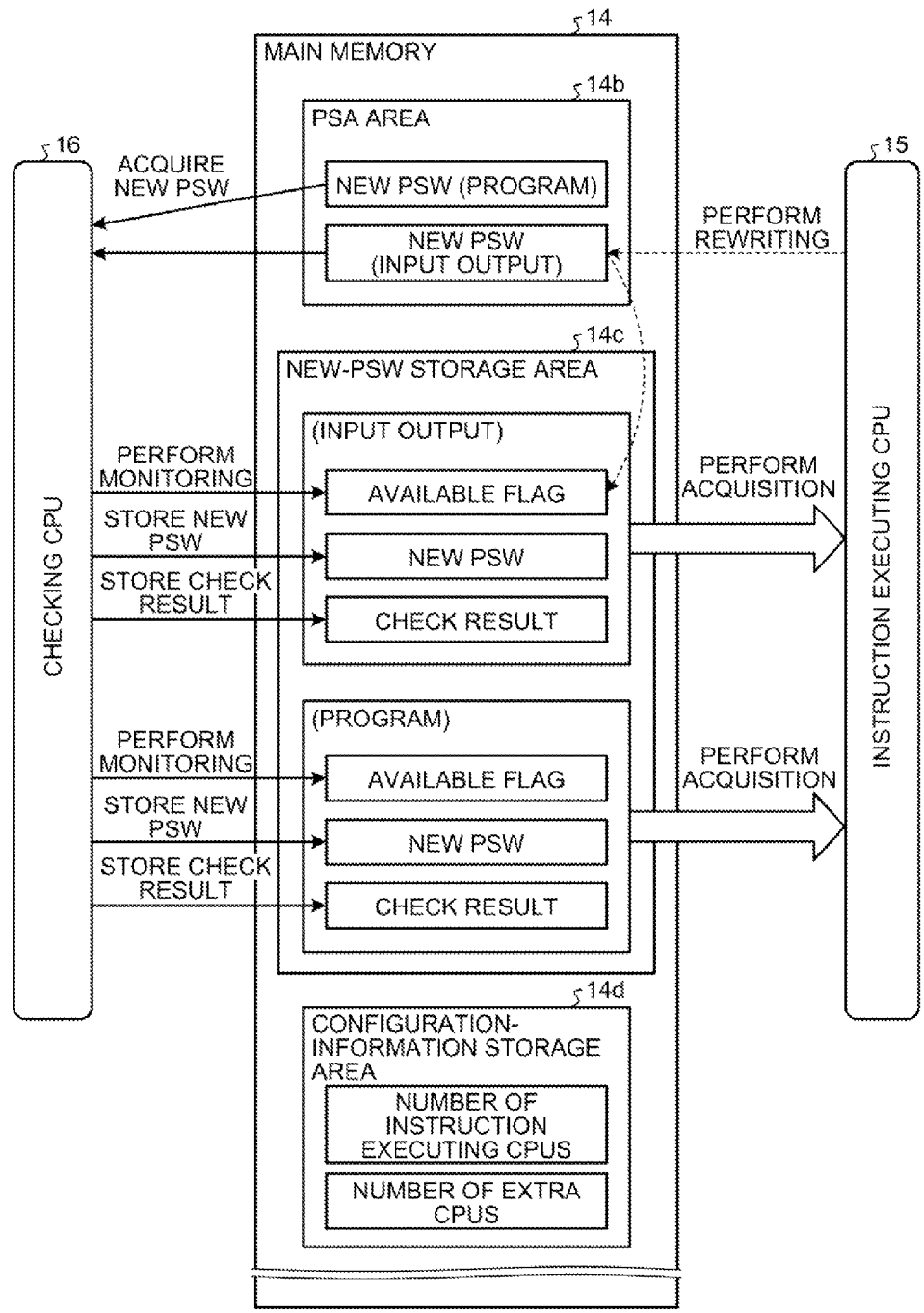
FIG. 6 is a diagram explaining an example of a relationship between a format check of a new PSW and an interrupt process.

A relationship between a format check of a new PSW and an interrupt process will be described below. FIG. 6 is a diagram explaining an example of a relationship between the format check of a new PSW and the interrupt process. As illustrated in FIG. 6, the PSA area 14*b* stores therein a new PSW corresponding to a program interrupt and a new PSW corresponding to an input-output interrupt.

In this state, the checking CPU 16 periodically or continuously monitors the "available flag" that is stored in the new-PSW storage area 14c in association with a new PSW corresponding to the input-output interrupt (hereinafter, this PSW is described as a new PSW (input output)). When detecting that the new PSW (input output) is rewritten or when determining that the new PSW has not been checked, the checking CPU 16 loads the new PSW (input output) from the PSA area 14b. Subsequently, the checking CPU 16 executes a format check on the loaded new PSW (input output). The checking CPU 16 stores the new PSW (input output) and a check result in the new-PSW storage area 14c and updates the available flag.

Thereafter, the checking CPU 16, which has stored the check result, periodically or continuously monitors the available flag associated with the new PSW (input output). When detecting, from the available flag, that the new PSW (input output) is updated, the checking CPU 16 loads the new PSW (input output) from the PSA area 14b again. Subsequently, the checking CPU 16 executes the above format check, stores a result of the format check and the new PSW (input output) in the new-PSW storage area 14c, and updates the available flag.

Similarly, the checking CPU 16 periodically or continuously monitors the "available flag" that is stored in the new-PSW storage area 14c in association with a new PSW corresponding to a program interrupt (hereinafter, this PSW is described as a new PSW (program)). When detecting that the new PSW is rewritten or when determining that the new PSW has not been checked, the checking CPU 16 loads the new PSW (program) from the PSA area 14b. Subsequently, the checking CPU 16 executes a format check on the loaded new PSW (program). The checking CPU 16 stores the new PSW (program) and a check result in the new-PSW storage area 14c and updates the available flag.

Thereafter, the checking CPU 16, which has stored the check result, periodically or continuously monitors the available flag associated with the new PSW (program). When detecting, from the available flag, that the new PSW (program) is updated, the checking CPU 16 loads the new PSW (program) from the PSA area 14b again. Subsequently, the checking CPU 16 executes the above format check, stores a result of the format check and the new PSW (program) in the new-PSW storage area 14c, and updates the available flag.

On the other hand, when an input-output interrupt occurs, the instruction executing CPU 15 stores a PSW, which is maintained in a register or the like at the time of occurrence of the interrupt, in the PSA area 14b as an old PSW. Subsequently, the instruction executing CPU 15 acquires an available flag and a check result, which are stored in the new-PSW storage area 14c in association with the new PSW (input output). When determining that the new PSW (input output) is available, the instruction executing CPU 15 loads the new PSW (input output) from the new-PSW storage area 14c and executes the input-output interrupt by using an instruction address of the new PSW (input output).

Similarly, when a program interrupt occurs, the instruction executing CPU 15 stores a PSW, which is maintained in a register or the like at the time of occurrence of the interrupt, in the PSA area 14b as an old PSW. Subsequently, the instruction executing CPU 15 acquires an available flag and a check result that are stored in the new-PSW storage area 14c in association with the new PSW (program). When determining that the new PSW (program) is available, the instruction executing CPU 15 loads the new PSW (program) from the new-PSW storage area 14c and executes the program interrupt by using an instruction address of the new PSW (program).

When rewriting a new PSW (input output) stored in the PSA area 14b, the instruction executing CPU 15 updates the available flag, which is stored in the new-PSW storage area 14c in association with the new PSW (input output), at the same time of the rewriting. As a result, the checking CPU 16 can detect update of the new PSW (input output) and execute the format check again.

Similarly, when rewriting a new PSW (program) stored in the PSA area 14b, the instruction executing CPU 15 updates the available flag, which is stored in the new-PSW storage area 14c in association with the new PSW (program), at the same time of the rewriting. As a result, the checking CPU 16 can detect update of the new PSW (program) and execute the format check again.

The instruction executing CPU 15 may include the check processing unit 16a and the check-result storing unit 16b in addition to the instruction-emulation executing unit 15a, the interrupt executing unit 15b, and the new-PSW updating unit 15c. By executing the determination process between various processes, such as a normal arithmetic process and an interrupt process, the CPU 4 can execute the interrupt process without performing a format check of a new PSW.

Flow of Processes

Figure 7:
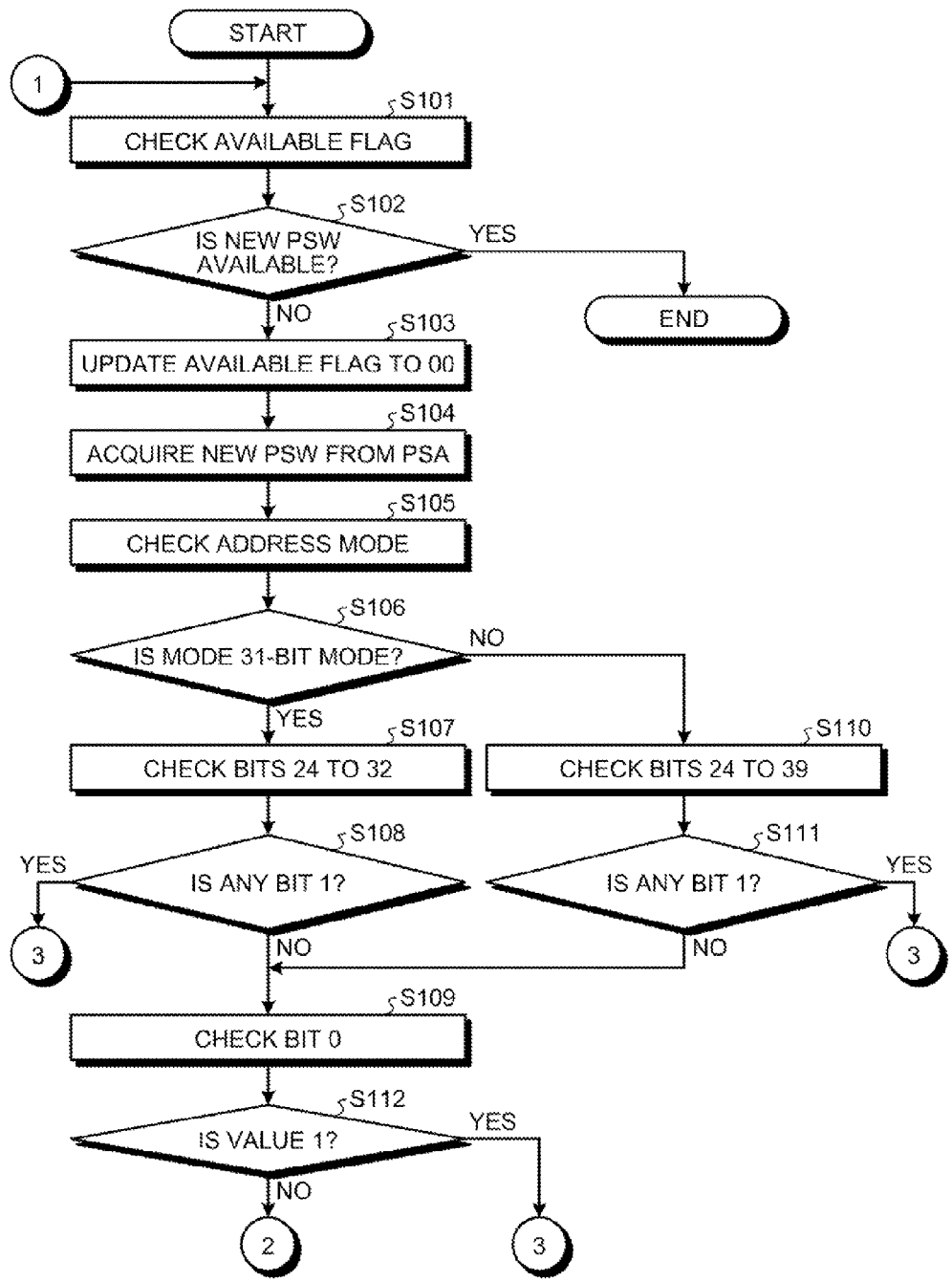
FIG. 7 is a flowchart of the flow of the format check of a new PSW.
Figure 8:
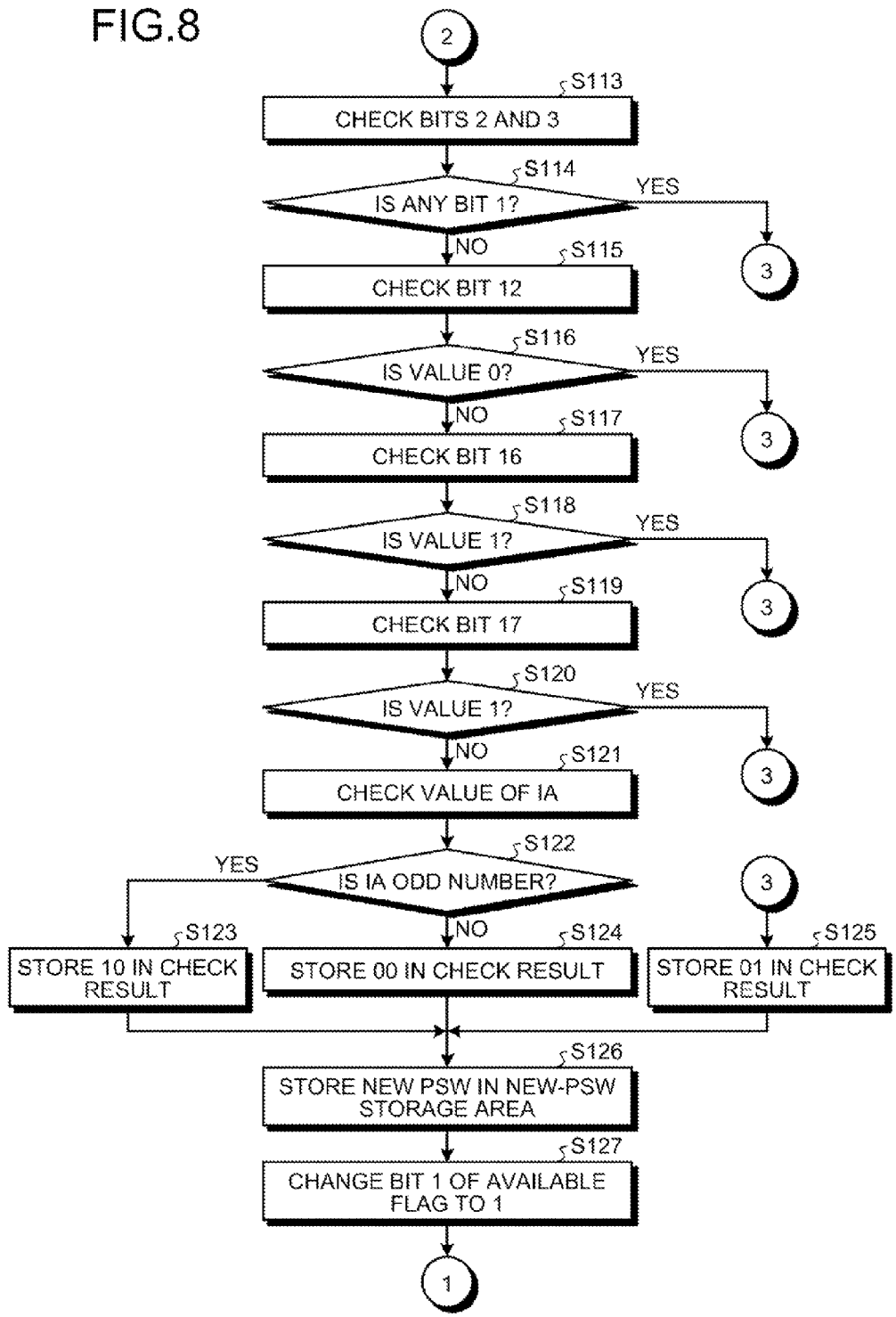
FIG. 8 is another flowchart of the flow of the format check of a new PSW.
Figure 9:
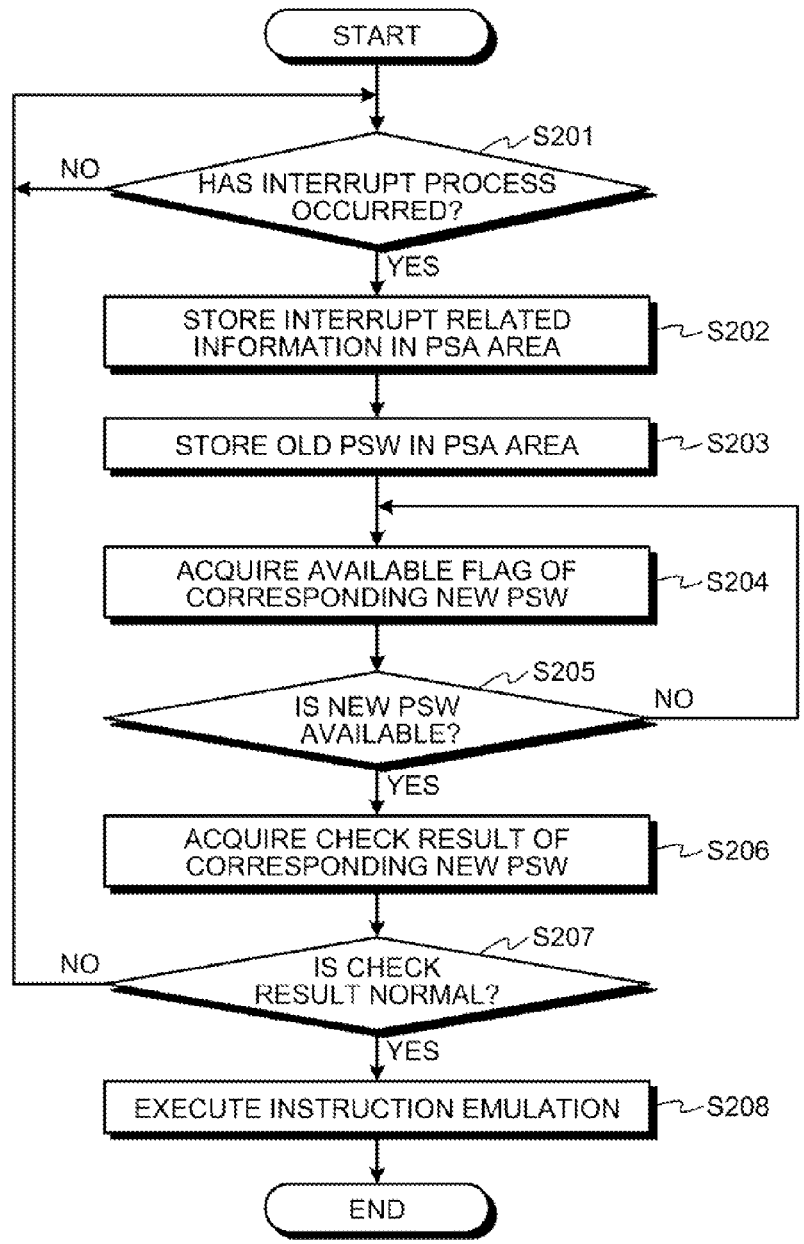
FIG. 9 is a flowchart of the flow of the interrupt process.

The flow of processes performed by the information processing apparatus 10 will be explained below with reference to FIGS. 7 to 9. FIGS. 7 and 8 are flowcharts of the flow of the format check of a new PSW. FIG. 9 is a flowchart of the flow of the interrupt process.

Flow of the Format Check of a New PSW

As illustrated in FIG. 7, the checking CPU 16 checks an "available flag" for each type of an interrupt stored in the new-PSW storage area 14c (S101) and determines whether or not a new PSW is available (S102).

When "bit 0, bit 1" of the "available flag" is "0, 1", the checking CPU 16 determines that the new PSW is available (YES at S102) and ends the process. On the other hand, when "bit 0, bit 1" of the "available flag" is other than "0, 1", the checking CPU 16 determines that the new PSW is unavailable (NO at S102) and updates "bit 0, bit 1" of the "available flag" to "0, 0" (S103).

The checking CPU 16 acquires a corresponding new PSW from the PSA area 14b (S104), checks an address mode used in the information processing apparatus 10 (S105), and determines whether the address mode is a 31-bit mode or not (S106).

When the address mode is the 31-bit mode (YES at S106), the checking CPU 16 determines whether or not any of the bits 24 to 32 of the new PSW is 1 (S107 and S108). When any of the bits 24 to 32 of the new PSW is 1 (YES at S108), the checking CPU 16 executes a process at S125. That is, the checking CPU 16 stores "01" in a check result of a new PSW to be subjected to a format check. When all of the bits 24 to 32 of the new PSW is 0 (NO at S108), the checking CPU 16 checks a bit 0 (S109).

On the other hand, when the address mode is not the 31-bit mode, that is, when the address mode is a 24-bit mode (NO at S106), the checking CPU 16 determines whether or not any of the bits 24 to 39 of the new PSW is 1 (S110 and S111). When any of the bits 24 to 39 of the new PSW is 1 (YES at S111), the checking CPU 16 executes the process at S125. When all of the bits 24 to 39 are 0 (NO at S111), the checking CPU 16 checks a bit 0 of the new PSW (S109).

Thereafter, when determining that the bit 0 of the new PSW is 1 (YES at S112), the checking CPU 16 executes the process at S125. On the other hand, as illustrated in FIG. 7, when determining that the bit 0 of the new PSW is 0 (NO at S112), the checking CPU 16 checks bits 2 and 3 of the new PSW (S113).

When any of the bits 2 and 3 of the new PSW is 1 (YES at S114), the checking CPU 16 executes the process at S125. On the other hand, when both of the bits 2 and 3 of the new PSW are 0 (NO at S114), the checking CPU 16 checks a bit 12 of the new PSW (S115). Because the instruction executing CPU 15 operates in an extended control mode, 1 is set to the bit 12 of the new PSW.

Subsequently, when the bit 12 of the new PSW is 0 (YES at S116), the checking CPU 16 executes the process at S125. On the other hand, when the bit 12 of the new PSW is 1 (NO at S116), the checking CPU 16 checks a bit 16 of the new PSW (S117).

When the bit 16 of the new PSW is 1 (YES at S118), the checking CPU 16 executes the process at S125. On the other hand, when the bit 16 of the new PSW is 0 (NO at S118), the checking CPU 16 checks a bit 17 of the new PSW (S119).

When the bit 17 of the new PSW is 1 (YES at S120), the checking CPU 16 executes the process at S125. On the other hand, when the bit 17 of the new PSW is 0 (NO at S120), the checking CPU 16 checks an instruction address of the new PSW (S121).

When the instruction address of the new PSW is an odd number (YES at S122), the checking CPU 16 stores "10" in a check result (S123). On the other hand, when the instruction address of the new PSW is an even number (NO at S122), the checking CPU 16 stores "00" in the check result (S124).

When determining YES at S108, S112, S114, S116, S118, and S120, that is, when it is determined that the new PSW causes early specification exception, the checking CPU 16 stores "01" in the check result (S125).

Thereafter, the checking CPU 16 stores the new PSW, for which the format check has been completed, and the check result in a predetermined area of the new-PSW storage area 14*c* in an association manner (S126), and changes a bit 1 of the available flag to 1 (S127). At this time, a bit 0 of the available flag is 0 until the new PSW is rewritten. Thereafter, the process returns to S101 and the above processes are repeated.

Flow of the Interrupt Process

As illustrated in FIG. 9, when an interrupt process occurs (YES at S201), the instruction executing CPU 15 stores interrupt related information in a predetermined area of the PSA area 14*b* (S202). The instruction executing CPU 15 stores a PSW, which is maintained in a register or the like at the time of occurrence of the interrupt, in a predetermined area of the PSA area 14*b* as an old PSW (S203).

Thereafter, the instruction executing CPU 15 acquires, from the new-PSW storage area 14*c*, an available flag of a new PSW corresponding to the interrupt that has occurred (S204) and determines whether or not the new PSW is available (S205).

When determining that the new PSW is available (YES at S205), the instruction executing CPU 15 acquires a check result of the new PSW from the new-PSW storage area 14*c* (S206).

When the check result of the new PSW is normal (YES at S207), the instruction executing CPU 15 executes the interrupt process by using an instruction address of the new PSW (S208).

On the other hand, when the check result of the new PSW is not normal (NO at S207), the instruction executing CPU 15 determines that exception handling has occurred and repeats the process at S201. When determining that the new PSW is unavailable (NO at S205), the instruction executing CPU 15 repeats the process at S204.

Advantages of the Second Embodiment

According to the second embodiment, the checking CPU 16 determines whether or not a new PSW corresponding to an interrupt process contains an error. The checking CPU 16 stores the new PSW, for which whether an error is contained or not has been determined, and a determination result in the new-PSW storage area 14*c* in an associated manner. When an interrupt process occurs, the instruction executing CPU 15 acquires a determination result of a new PSW corresponding to the interrupt process from the new-PSW storage area 14*c*. When the acquired determination result is normal, the instruction executing CPU 15 executes the interrupt process by using an instruction address of the new PSW associated with the determination result.

That is, the checking CPU 16 executes a format check of a new PSW and stores the result of the format check in advance of an interrupt process. Consequently, the instruction executing CPU 15, which executes an interrupt process, need not check the new PSW when executing the interrupt process. Therefore, even when an interrupt process occurs a number of times, it is possible to reduce overhead of the interrupt process. As a result, it is possible to reduce process time of the interrupt process.

Furthermore, a format check is executed when a new PSW is rewritten, so that it is possible to synchronize update of the new PSW with the check result. Therefore, it is possible to prevent inconsistency, in which, for example, an old check result for which a format check has not been executed is maintained even after the new PSW is updated.

[c] Third Embodiment

In the second embodiment, an example is explained in which one checking CPU and one instruction executing CPU are used. However, the present invention is not limited to this example. For example, it is possible to use two checking CPUs and one instruction executing CPU or it is possible to use one checking CPU and two instruction executing CPUs. In a third embodiment, an example will be explained in which a plurality of checking CPUs and a plurality of instruction executing CPUs are used.

When a Plurality of Checking CPUs and One Instruction Executing CPU are Used

Figure 10:
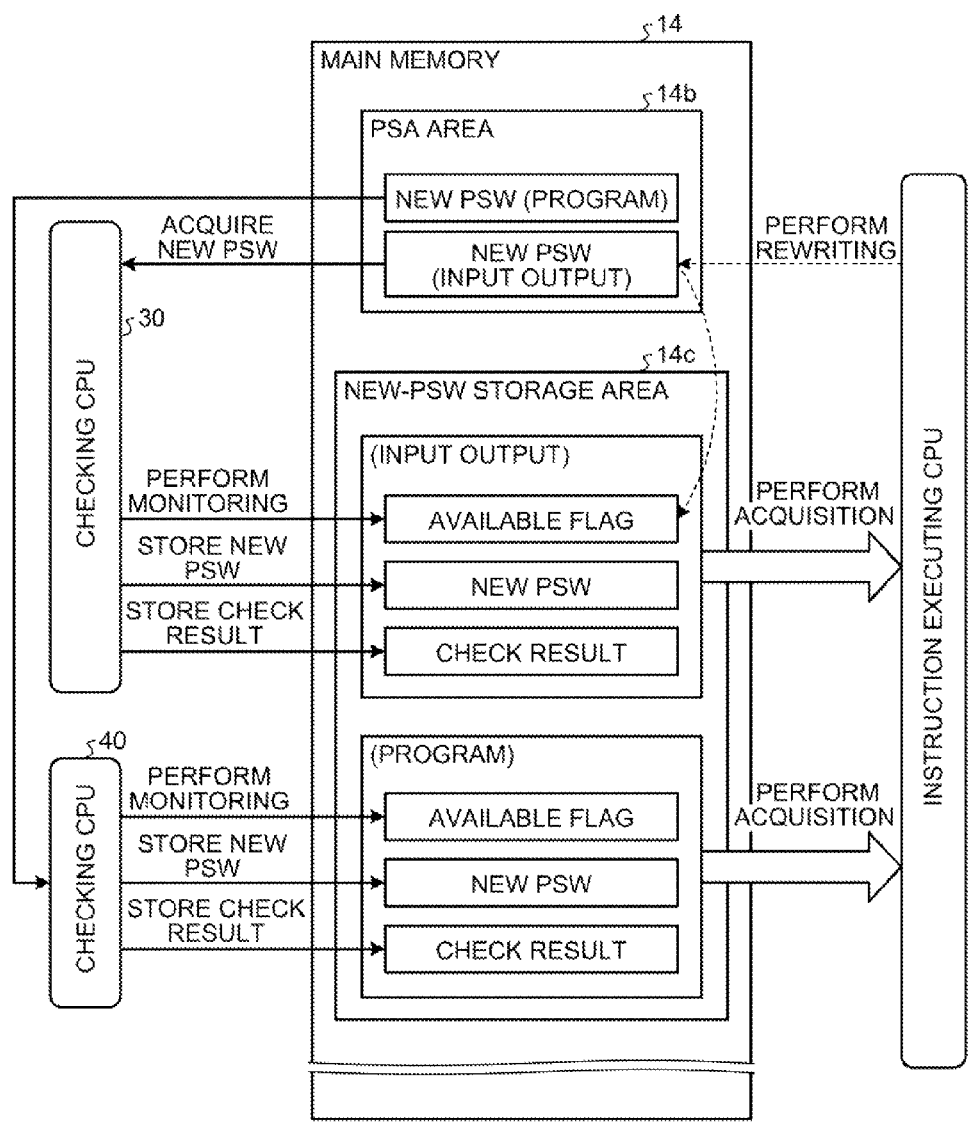
FIG. 10 illustrates an example in which the format check of a new PSW is executed by using a plurality of CPUs.

FIG. 10 illustrates an example in which a format check of a new PSW is executed by using a plurality of CPUs. As illustrated in FIG. 10, an information processing apparatus includes an instruction executing CPU, a checking CPU 30, a checking CPU 40, and a main memory.

The main memory is the same as the main memory 14 explained in the second embodiment and the instruction executing CPU is the same as the instruction executing CPU 15 explained in the second embodiment; therefore, detailed explanation will not be repeated.

The checking CPU 30 is a CPU that executes a format check of a new PSW (input output) corresponding to an input-output interrupt. For example, the checking CPU 30 periodically or continuously monitors an "available flag" that is stored in the new-PSW storage area 14*c* in association with a new PSW (input output). When detecting that the new PSW (input output) is rewritten or when determining that the new PSW has not been checked, the checking CPU 30 loads the new PSW (input output) from the PSA area 14*b*. Subsequently, the checking CPU 30 executes a format check of the loaded new PSW (input output). Then, the checking CPU 30 stores the new PSW (input output) and a check result in the new-PSW storage area 14c and updates the available flag.

Thereafter, the checking CPU 30, which has stored the check result, periodically or continuously monitors the available flag associated with the new PSW (input output). When detecting, from the available flag, that the new PSW (input output) is updated, the checking CPU 30 loads the new PSW (input output) from the PSA area 14b. Subsequently, the checking CPU 30 executes the above format check, stores the result of the format check and the new PSW (input output) in the new-PSW storage area 14c, and updates the available flag.

The checking CPU 40 is a CPU that executes a format check of a new PSW (program) corresponding to a program interrupt. For example, the checking CPU 40 periodically or continuously monitors an "available flag" that is stored in the new-PSW storage area 14c in association with a new PSW (program). When detecting that the new PSW (program) is rewritten or when determining that the new PSW has not been checked, the checking CPU 40 loads the new PSW (program) from the PSA area 14b. Subsequently, the checking CPU 40 executes a format check of the loaded new PSW (program). Then, the checking CPU 40 stores the new PSW (program) and a check result in the new-PSW storage area 14c and updates the available flag.

Thereafter, the checking CPU 40, which has stored the check result, periodically or continuously monitors the available flag associated with the new PSW (program). When detecting, from the available flag, that the new PSW (program) is updated, the checking CPU 40 loads the new PSW (program) from the PSA area 14b. Subsequently, the checking CPU 40 executes the above format check, stores the result of the format check and the new PSW (program) in the new-PSW storage area 14c, and updates the available flag.

When One Checking CPU and a Plurality of Instruction Executing CPUs are Used

Figure 11:
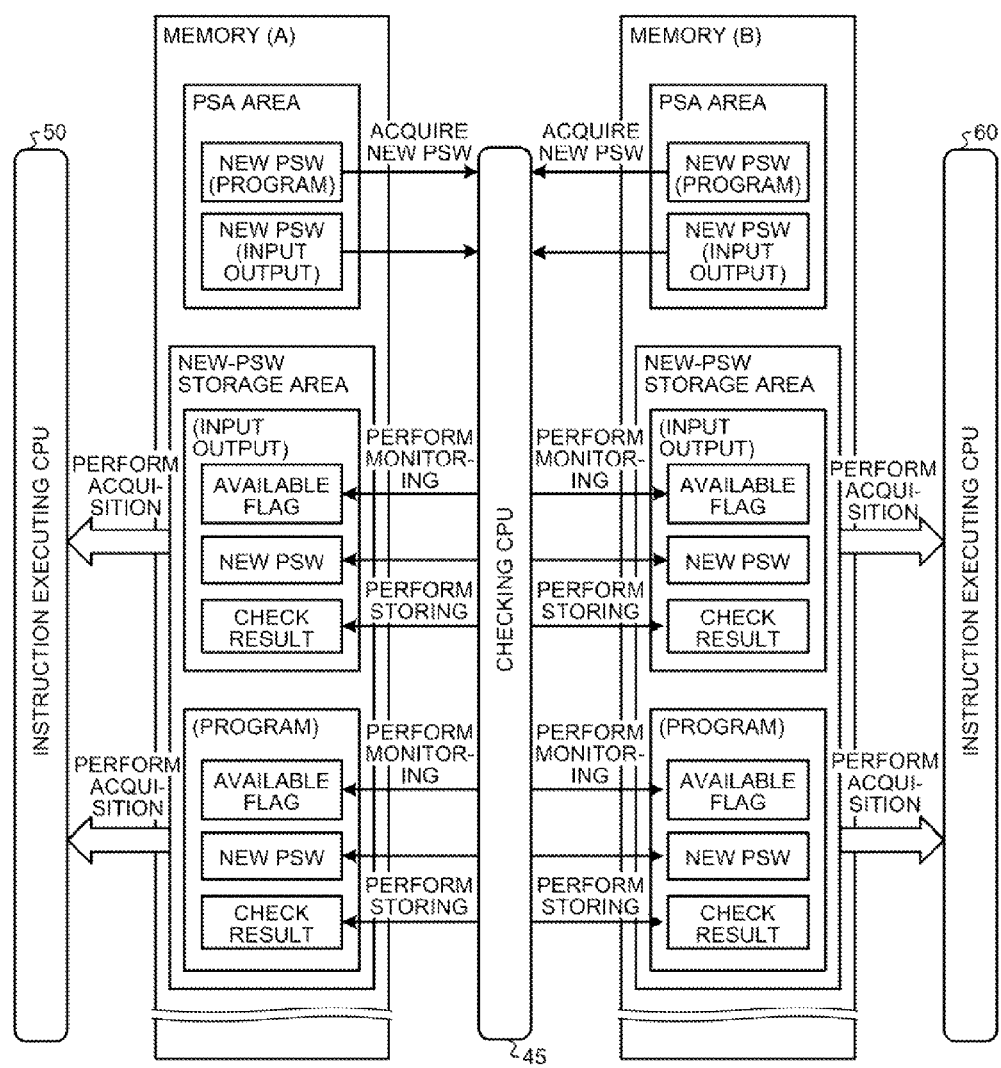
FIG. 11 illustrates an example in which the format check of a new PSW is executed for a plurality of instruction executing CPUs.

FIG. 11 illustrates an example in which a format check of a new PSW is executed for a plurality of instruction executing CPUs. As illustrated in FIG. 11, an information processing apparatus includes a memory (A), a memory (B), an instruction executing CPU 50, an instruction executing CPU 60, and a checking CPU 45.

The memory (A) is a storage unit representing a memory space for architecture to be emulated by the instruction executing CPU 50, and includes a PSA area and a new-PSW storage area. The PSA area stores therein a new PSW corresponding to a type of an interrupt. The new-PSW storage area stores therein a new PSW, an available flag, and a check result for each type of an interrupt, in an associated manner.

The memory (B) is a storage unit representing a memory space for architecture to be emulated by the instruction executing CPU 60, and includes a PSA area and a new-PSW storage area. The PSA area stores therein a new PSW corresponding to a type of an interrupt. The new-PSW storage area stores therein a new PSW, an available flag, and a check result for each type of an interrupt, in an associated manner.

The instruction executing CPU 50 is a CPU that executes an interrupt process except for a format check of a new PSW and executes an instruction emulation process. The instruction executing CPU 50 has the same functions as those of the instruction executing CPU 15 explained in the second embodiment. The instruction executing CPU 50 refers to the storage area (A) that stores therein information related to architecture to be emulated, and executes an interrupt process or the like by using various types of information on the new PSW stored in the memory (A).

For example, when an input-output interrupt occurs, the instruction executing CPU 50 stores a PSW, which is maintained in a register or the like at the time of occurrence of the interrupt, in the memory (A) as an old PSW. Thereafter, the instruction executing CPU 50 acquires an available flag and a check result, which are stored in the memory (A) in association with the new PSW (input output). When determining that the new PSW (input output) is available, the instruction executing CPU 50 loads the new PSW (input output) from the memory (A) and executes the input-output interrupt by using an instruction address of the new PSW (input output).

The instruction executing CPU 60 is a CPU that executes an interrupt process except for a format check of a new PSW and executes an instruction emulation process. The instruction executing CPU 60 has the same functions as those of the instruction executing CPU 15 explained in the second embodiment. The instruction executing CPU 60 refers to the memory (B) that stores therein information related to architecture to be emulated, and executes an interrupt process or the like by using various types of information on the new PSW stored in the memory (B).

For example, when an input-output interrupt occurs, the instruction executing CPU 60 stores a PSW, which is maintained in a register or the like at the time of occurrence of the interrupt, in the memory (B) as an old PSW. Thereafter, the instruction executing CPU 60 acquires an available flag and a check result, which are stored in the memory (B) in association with the new PSW (input output). When determining that the new PSW (input output) is available, the instruction executing CPU 60 loads the new PSW (input output) from the memory (B) and executes the input-output interrupt by using an instruction address of the new PSW (input output).

The checking CPU 45 is a CPU that executes a format check of a new PSW (program) corresponding to a program interrupt. The checking CPU 45 executes a format check of the new PSW stored in each of the memory (A) and the memory (B) and stores a check result or the like in the memory (A) and the memory (B).

For example, the checking CPU 45 periodically or continuously monitors an "available flag" that is stored in the memory (A) in association with a new PSW (program). When detecting that the new PSW (program) is rewritten or when determining that the new PSW has not been checked, the checking CPU 45 loads the new PSW (program) from the memory (A). Subsequently, the checking CPU 45 executes a format check of the loaded new PSW (program). The checking CPU 45 stores the new PSW (program) and a check result in the memory (A) and updates the available flag.

Thereafter, the checking CPU 45, which has stored the check result, periodically or continuously monitors the available flag that is associated with the new PSW (program). When detecting, from the available flag, that the new PSW (program) is updated, the checking CPU 45 loads the new PSW (program) from the memory (A) again. Subsequently, the checking CPU 45 executes the above format check, stores a result of the format check and the new PSW (program) in the memory (A), and updates the available flag.

Similarly, the checking CPU 45 periodically or continuously monitors an "available flag" that is stored in the memory (B) in association with a new PSW (program). When detecting that the new PSW (program) is rewritten or when determining that the new PSW has not been checked, the checking CPU 45 loads the new PSW (program) from the memory (B). Subsequently, the checking CPU 45 executes a format check of the loaded new PSW (program). The checking CPU 45 stores the new PSW (program) and a check result in the memory (B) and updates the available flag.

Thereafter, the checking CPU 45, which has stored the check result, periodically or continuously monitors the available flag that is associated with the new PSW (program). When detecting, from the available flag, that the new PSW (program) is updated, the checking CPU 45 loads the new PSW (program) from the memory (B) again. Subsequently, the checking CPU 45 executes the above format check, stores a result of the format check and the new PSW (program) in the memory (B), and updates the available flag.

Advantages of the Third Embodiment

According to the third embodiment, when a plurality of extra CPUs, in other words, a plurality of CPUs that is not executing a process, is present, it is possible to cause each of the CPUs to execute a format check of a new PSW of a different type of an interrupt. Therefore, it is possible to reduce loads on the checking CPU. Furthermore, it is possible to prevent delay in the format check of a new PSW, enabling to increase a process speed. Moreover, even when a plurality of architectures is in operation, it is possible to separately execute a format check of a new PSW by generating memory spaces corresponding to the respective architectures.

[d] Fourth Embodiment

While the embodiments of the present invention have been described above, the present invention may be embodied in various forms other than the embodiments described above. Different embodiments will be explained below.

Method of Allocating a Checking CPU

The information processing apparatus explained in the first to the third embodiments can determine how to allocate a checking CPU in accordance with information stored in the configuration-information storage area 14d. For example, when "the number of instruction executing CPUs" stored in the configuration-information storage area 14d is smaller than "the number of extra CPUs", the information processing apparatus performs allocation so that a format check of a new PSW for one instruction executing CPU is executed by using one or more extra CPUs. At this time, the number of types of interrupts for which the format check is performed by each checking CPU is made uniform.

When "the number of instruction executing CPUs" stored in the configuration-information storage area 14d is equal to "the number of extra CPUs", the information processing apparatus performs allocation so that a format check of a new PSW corresponding to one instruction executing CPU is executed by using one extra CPU. When "the number of instruction executing CPUs" stored in the configuration-information storage area 14d is greater than "the number of extra CPUs", the information processing apparatus performs allocation so that a format check of a new PSW corresponding to one or more instruction executing CPUs is executed by using one extra CPU. The configuration-information storage area 14d may be monitored by using a configuration in which rewrite of a specific area is detected and notified or may be monitored by allocating a process of monitoring a configuration-information storage area to another CPU.

Logical CPU

While an example of an information processing apparatus that includes a plurality of CPUs is explained in the first to the third embodiments, the present invention is not limited to this example. For example, it is possible to use a multi-core that includes a plurality of processor cores in one processor package. In this case, a core that executes a process is caused to function as an instruction executing CPU and a core that is not executing the process is caused to function as a checking CPU described above so that the same processes as those of the first to the third embodiments can be executed.

Application to an Apparatus that does not Perform Emulation

While an information processing apparatus that emulates architecture that is not physically mounted is explained in the first to the third embodiment, the present invention is not limited to this example. For example, any information processing apparatuses that do not emulate architecture and that include a plurality of CPUs or a multi-core can execute the same processes as those of the first to the third embodiments.

Check Method

While an example is explained in the first to the third embodiments, in which a format check of a new PSW is executed by using a 31-bit mode or a 24-bit mode as an address mode, the present invention is not limited to this example. For example, it is possible to use arbitrary check methods that are specified in accordance with an address mode of a CPU or the like or a bit width.

System Configuration

Among the processes described in the present embodiments, all or a part of the processes explained to be automatically performed can be manually performed, or all or a part of the processes explained to be manually performed can be automatically performed with any known methods. Also, process procedures, control procedures, concrete titles, and information including, for example, various types of data and parameters illustrated in FIGS. 3 to 5, can be arbitrarily changed unless otherwise specified.

The components of each device illustrated in the drawings are only for conceptually illustrating the functions thereof and are not necessarily physically configured as illustrated in the drawings. In other words, the specific forms of separate or integrated devices, for example, the check processing unit 16a and the check-result storing unit 16b, are not limited to those illustrated in the drawings. All or part of the device can be configured by functionally or physically separating or integrating any of the units depending on various loads or use conditions.

Furthermore, all or any part of the process functions performed by each device can be implemented by a CPU and by programs analyzed and executed by the CPU or implemented as hardware by wired logic.

Program

The various processes described in the above embodiments may be realized by causing a computer system, such as a personal computer or a workstation, to execute a computer program that is prepared in advance. An example of a computer system that executes a computer program having the same functions as those of the above embodiments will be explained below.

Figure 12:
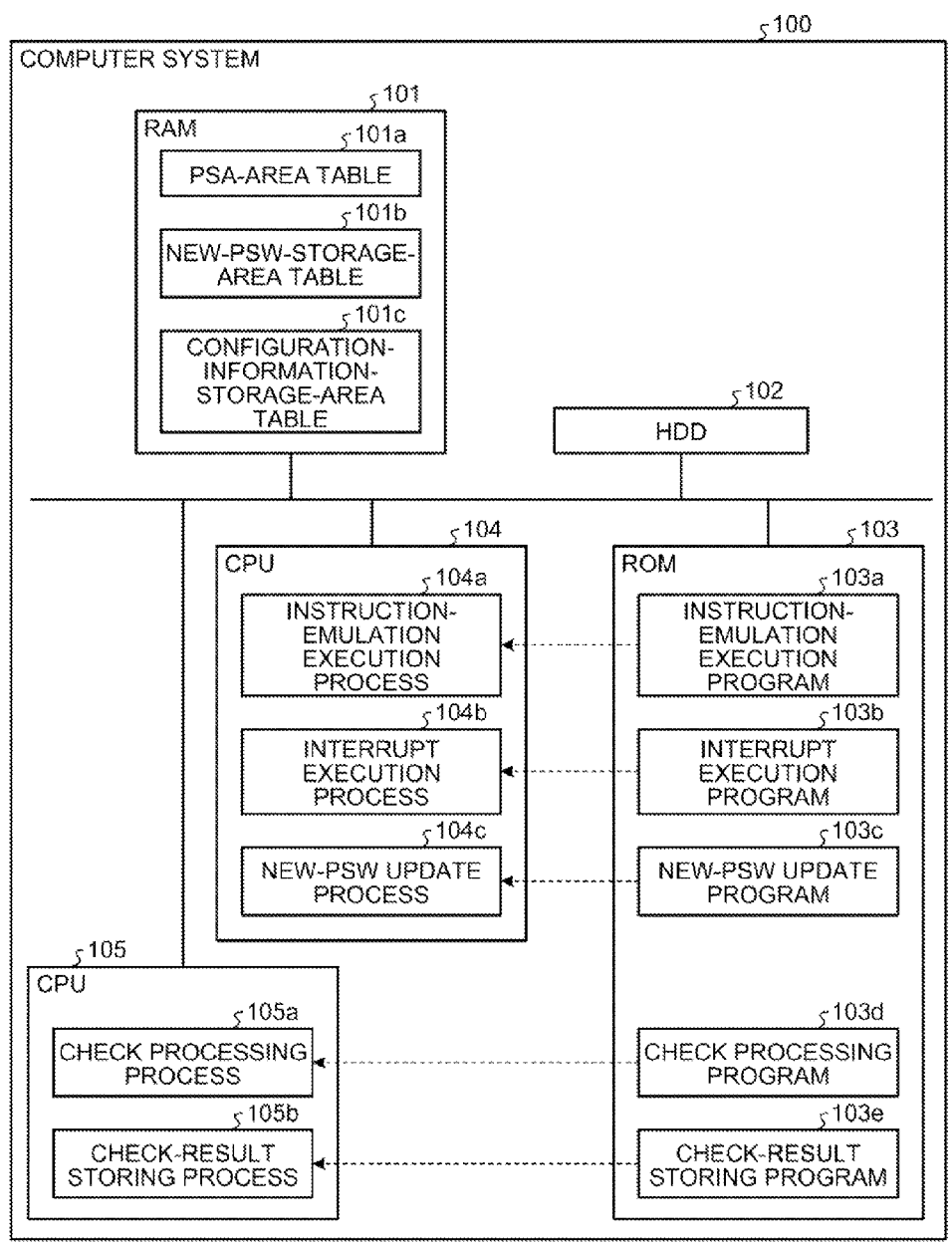
FIG. 12 illustrates an example of a computer system that executes an interrupt control program.

FIG. 12 illustrates an example of a computer system that executes an interrupt control program. As illustrated in FIG. 12, a computer system 100 includes a RAM 101, an HDD 102, a ROM 103, a CPU 104, and a CPU 105. A program that implements the same functions as those of the above embodiments is stored in advance in the ROM 103. As illustrated in FIG. 12, an instruction-emulation execution program 103a, an interrupt execution program 103b, and a new-PSW update program 103c are stored in the ROM 103. Also, a check processing program 103d and a check-result storing program 103e are stored in the ROM 103.

The CPU 104 and the CPU 105 read and execute the programs 103a to 103e, so that processes are loaded as illustrated in FIG. 12. That is, the programs 103a to 103e become an instruction-emulation execution process 104a, an interrupt execution process 104b, a new-PSW update process 104c, a check processing process 105a, and a check-result storing process 105b, respectively.

The instruction-emulation execution process 104a corresponds to the instruction-emulation executing unit 15a illustrated in FIG. 2, and the interrupt execution process 104b corresponds to the interrupt executing unit 15b. Furthermore, the new-PSW update process 104c corresponds to the new-PSW updating unit 15c illustrated in FIG. 2 and the check processing process 105a corresponds to the check processing unit 16a. Moreover, the check-result storing process 105b corresponds to the check-result storing unit 16b illustrated in FIG. 2.

A PSA-area table 101a, a new-PSW-storage-area table 101b, and a configuration-information-storage-area table 101c are provided in the RAM 101. The PSA-area table 101a corresponds to the PSA area 14b illustrated in FIG. 2, the new-PSW-storage-area table 101b corresponds to the new-PSW storage area 14c, and the configuration-information-storage-area table 101c corresponds to the configuration-information storage area 14d.

The programs 103a to 103e described above are not necessarily stored in the ROM 103. For example, the programs 103a to 103e may be stored in a "portable physical medium", such as a flexible disk (FD), a CD-ROM, an MO disk, a DVD disk, a magnet-optical disk, or an IC card, that are inserted into the computer system 100; a "fixed physical medium", such as a hard disk drive (HDD) that is provided inside or outside the computer system 100; or "another computer system (or a server)" that is connected to the computer system 100 via a public line, the Internet, LAN, WAN, or the like, so that the computer system 100 can read out and execute the programs from these media.

That is, the programs in the other embodiments are recorded in a computer-readable manner in a recording medium, such as the above "portable physical medium", the "fixed physical medium", or the "computer medium". The computer system 100 reads and executes the programs from the recording medium to thereby implement the same functions as those of the above embodiments. The programs in the other embodiments are not necessarily executed by the computer system 100. For example, even when other computer systems or servers execute the programs or even when these systems or the servers execute the programs in cooperation with each other, the present invention can be applied.

According to one aspect of the information processing apparatus and the interrupt control program, it is possible to shorten process time of an interrupt process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a first memory area configured to store therein a first program status word containing an address of data that is to be read when an interrupt process is executed;
a second memory area configured to store a second program status word; and
a processor configured to determine whether or not the first program status word stored in the first memory area is available in advance of an execution of the interrupt process, to store a determination result in association with the first program status word in the first memory area, to acquire the first program status word and the determination result from the first memory area when the interrupt process occurs, to execute the interrupt process by using the address contained in the acquired first program status word when the acquired determination result indicates that the first program status word is available, and to resume a process that has been interrupted due to the occurrence of the interrupt process by using an instruction address contained in the second program status word.

2. The information processing apparatus according to claim 1, wherein
each of the program status words is data that contains predetermined data determined by a format corresponding to each of the program status words, at a predetermined data position within each of the program status words, and
when the first program status word contains predetermined data at the predetermined data position, the processor determines that the first program status word is available.

3. The information processing apparatus according to claim 1, wherein the processor is configured to save the second program status word which is stored in the second memory area at the time the interrupt process occurs to a temporary memory area, and to resume, when the interrupt process is completed, the process that has been interrupted due to the occurrence of the interrupt process by using an instruction address of the second program status.

4. An interrupt control method for an information processing apparatus, the method comprising:
determining whether or not a first program status word stored in a first memory area is available in advance of an execution of an interrupt process, the first program status word containing an address of data that is to be read when the interrupt process is executed;
storing a determination result obtained at the determining in the first memory area in association with the first program status word;
acquiring the first program status word and the determination result from the first memory area when the interrupt process occurs; and
executing the interrupt process by using the address contained in the acquired first program status word when the acquired determination result indicates that the first program status word is available and resuming a process that has been interrupted due to the occurrence of the interrupt process by using an instruction address contained in a second program status word stored in a second memory area.

5. The information processing apparatus according to claim 1, wherein the processor is configured to determine whether or not the first program status word is available based on whether or not the first program status word stored in the first memory area is the latest and whether or not a format of the first program status word is correct, and to read the data on the basis of the address when the first program status word stored in the first memory area is the latest and the format of the first program status word stored in the first memory area is correct.

6. The information processing apparatus according to claim 5, wherein the processor is configured to monitor whether or not the first program status word stored in the first memory area is updated, to determine, when the first program status word is updated, whether or not the updated first program status word is available.

* * * * *